United States Patent [19]

Sluma et al.

[11] Patent Number: 5,013,765

[45] Date of Patent: May 7, 1991

[54] METHOD FOR SULFONATING AROMATIC POLYETHER SULFONES

[75] Inventors: Heinz-Dieter Sluma, Grossostheim; Dieter Huff, Obernburg, both of Fed. Rep. of Germany

[73] Assignee: Akzo N.V., Arnhem, Netherlands

[21] Appl. No.: 343,604

[22] Filed: Apr. 27, 1989

[30] Foreign Application Priority Data

Apr. 30, 1988 [DE] Fed. Rep. of Germany ....... 3814759
Apr. 30, 1988 [DE] Fed. Rep. of Germany ....... 3814760

[51] Int. Cl.$^5$ .......................... C08J 5/20; C08G 75/23
[52] U.S. Cl. ........................................ 521/27; 521/29; 525/534
[58] Field of Search .................. 525/534, 535; 521/27, 521/29, 30

[56] References Cited

U.S. PATENT DOCUMENTS 3,709,841  1/1973  Quentin .
4,208,508  6/1980  Hashino ............................. 528/175
4,508,852  4/1985  Bikson et al. ........................ 521/27

FOREIGN PATENT DOCUMENTS 0008894  3/1980  European Pat. Off. .
0086235  8/1983  European Pat. Off. .
0112724  7/1984  European Pat. Off. .
0121911  10/1984  European Pat. Off. .
2090843  7/1982  United Kingdom .

OTHER PUBLICATIONS

Patents Abstracts of Japan, C-278 Apr. 25, 1985; vol. 9/No. 96, Abstract 59-228017(A).
Japanese Abstract No. 58-091-822-A.

*Primary Examiner*—Christopher Henderson
*Attorney, Agent, or Firm*—Oliff & Berridge

[57] ABSTRACT

The sulfonation of aromatic polyether sulfones in a controllable manner is possible by means of sulfur trioxide in concentrated sulfuric acid as solvent. By maintaining a sulfur trioxide content of less than 6 percent by weight, based on the solvent, and a reaction temperature of less than 30° C., side reactions and degradation reactions are to a large extent suppressed. The resultant products are suitable for preparation of membranes.

18 Claims, No Drawings

METHOD FOR SULFONATING AROMATIC POLYETHER SULFONES

TECHNICAL FIELD

The invention relates to a method for sulfonating aromatic polyether sulfones by means of a solution of sulfur trioxide in concentrated sulfuric acid, using a solvent for the corresponding polyether sulfone. It further relates to sulfonated polyether sulfones preparable by this method and to the use of sulfonated polyether sulfones prepared by this method for the preparation of membranes.

BACKGROUND

Aromatic polyether sulfones are polymers whose monomeric self-repeating units have at least (a) a sulfone group between two aromatic radicals and (b) an ether linkage between two aromatic radicals, the two aromatic radicals between which the sulfone group is located being in each case linked to another aromatic radical via an ether linkage. The attachment of the aromatic radicals present in the monomeric unit to the corresponding substituents can in each case occur in the ortho, meta or para position. The aromatic radicals may optionally be further substituted, in which case, however, at least one hydrogen atom linked to the aromatic ring is present in each aromatic radical of the monomeric unit, which atom may be substituted by the sulfonic acid group by means of a sulfonation reaction.

Typical representatives of such polyether sulfones are polymers having the following self-repeating structural unit

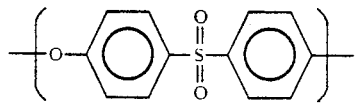

Such polymers are commercially available products.

Aromatic polyether sulfones are known polymers which are already in use in various areas of application, use being made of their good thermal, mechanical and chemical stability. Examples of areas of application are automotive spare parts, electrical connections and coatings.

Polyether sulfones have also already been utilized for the preparation of membranes used in materials separation processes, use being made of the resistance of the material, for example, to water, chlorine and a number of organic solvents. Membranes made from polyether sulfones are described, for example, in EP-A 0,121,911.

Membranes made of such materials are, for a number of applications which require a highly hydrophilic character, insufficiently hydrophilic; this drawback manifests itself, for example, by insufficiently rapid wetting by liquid aqueous systems.

Attempts were therefore made to modify polyether sulfones by introducing ionic or dissociable substituents. One such possibility is to introduce sulfonic acid groups which may be subsequently converted to salts. The substitution of the aromatic polyether sulfones takes place on the aromatic ring system and is frequently carried out using a sulfonating agent. Chlorosulfonic acid may be used for this purpose as the sulfonating agent. A corresponding process is described, for example, in U.S. Pat. No. 4,508,852. Using chlorosulfonic acid has the disadvantage of side reactions occurring. Thus the method of the U.S. Patent referred to above gives rise not only to sulfonated, but also to chlorosulfonated products. Furthermore, the reaction in organic solvents at temperatures of more than 40° C. described therein leads partially to the formation of undesirable crosslinked polymers.

Attempts to sulfonate polyether sulfones using concentrated sulfuric acid indicated that this method was applicable only to those polymers whose monomeric units are substituted in a suitable manner. Thus it can be concluded from EP-A 0,008,894 that phenylene radicals which have always an ether linkage in the 1,4-position, may be sulfonated using concentrated sulfuric acid, but this does not hold for phenylene radicals which have a sulfonic group and an ether linkage together in para-position. The reason for this is presumably to be found in the strongly electron-attracting effects of the sulfonic group. It is true that EP-A 0,008,894 states that these less reactive phenylene groups referred to can be acted upon by chlorosulfonic acid or oleum, but the use of these sulfonating agents is discouraged since they are said to lead to a high degree of sulfonate and/or polymer degradation. A controllable sulfonation reaction using chlorosulfonic acid or oleum is said not to be possible. EP-A 0,112,724 makes the same assertion.

According to U.S. Pat. No. 3,709,841, sulfonation of polyether sulfones is successful even using chlorosulfonic acid or oleum if the reaction is carried out in an inert solvent. Suitable solvents are said to be chlorinated hydrocarbons. The disadvantage of using these solvents is, inter alia, their toxicity. Removal of the solvents used also creates problems.

Accordingly, in contrast to the known methods described, sulfonation using concentrated sulfuric acid containing sulfur trioxide (oleum, fuming sulfuric acid) as solvent would be desirable.

SUMMARY OF THE INVENTION

An object of the present invention was to develop a method for sulfonating polyether sulfones (a) which makes sulfonation possible in a controllable manner, inter alia with even less reactive aromatic radicals in the polymers, by means of sulfur trioxide in concentrated sulfuric acid without resorting to organic solvents, and (b) which gives rise to sulfonated polymers without the formation of large amounts of by-products or degradation products, especially in the case where linear polyether sulfones which are built up from the following monomeric units

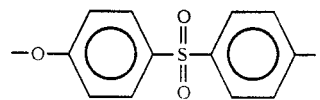

are used.

This and other objects are achieved by a method wherein concentrated sulfuric acid is used as solvent, the content of sulfur trioxide, based on the total amount of pure sulfuric acid present in the reaction mixture, is kept to a value of less than 6 per cent by weight throughout the whole of the sulfonation and the temperature of the reaction mixture is kept at less than +30° C. throughout the reaction.

DETAILED DESCRIPTION OF PREFERRED EMBODIMENTS

It was found, surprisingly, that if these conditions are kept, a controllable sulfonation of aromatic polyether sulfones is possible and polymer degradation can be substantially or completely prevented. The degree of sulfonation, i.e. the quotient of the total number of the sulfonic acid groups in the polymer and the total number of self-repeating monomeric units, can be readily controlled by selective adjustment of polymer concentration, sulfur trioxide concentration and reaction time. A very simple way to this end consists of choosing a suitable reaction time, since the reaction may be at any time terminated by adding water to the reaction mixture or by pouring the reaction mixture into water. The method according to the invention is suitable for sulfonating those polyether sulfones which contain aromatic radicals and correspond to the definition stated at the outset. Within the scope of the present invention, aromatic polyether sulfones are understood to include copolymers in which the monomeric units stated at the outset are present in addition to other monomeric units. Substitution of hydrogen atoms by sulfonic acid radicals occurs on the aromatic radicals of the polyether sulfone groups and also, if appropriate, on aromatic radicals of other monomeric units.

It is an essential part of the method according to the invention to ensure that throughout the sulfonation the sulfur trioxide content is less than 6% by weight based on the total amount of pure sulfuric acid present in the reaction mixture.

The content of sulfur trioxide can be adjusted by the amounts of sulfuric acid and sulfur trioxide used, but any possible water content of the sulfuric acid used must be allowed for, i.e. the content of sulfur trioxide is based on 100% anhydrous sulfuric acid. If the sulfur trioxide is mixed in dissolved form (oleum, fuming sulfuric acid) with concentrated sulfuric acid then the oleum becomes thereby diluted, the sulfur trioxide content to be maintained refers of course to the total of the amount of 100% sulfuric acid derived from the oleum and the amount used for diluting the oleum.

It is possible that the concentrated sulfuric acid, not yet treated with oleum, and/or the polyether sulfone contains water. In that case the sulfur trioxide, added for example in the form of oleum, reacts first with water before the polymer is substituted. It follows that in this case more oleum can be used, i.e. the initial content of sulfur trioxide can be higher than the amount calculated from the 6% limit. It is only when the water has reacted with sulfur trioxide to form sulfuric acid that the sulfonation reaction, throughout which the stated limit of 6% by weight must not be attained, sets in.

It is expedient to operate even considerably below this limit, i.e. at less than 3% by weight or even, if appropriate, at not more than 1 to 1.5% by weight of sulfur trioxide throughout the whole of the reaction.

It is not necessary for the sulfur trioxide content in the sulfuric acid to lie unconditionally within a few percent by weight. Depending on the type of polymer used, the reaction time and/or the reaction temperature, sulfonation can be successful to the desired extent even using very small amounts of sulfur trioxide.

The sustainment of the limit for the sulfur trioxide content may be carried out, for example, by treating concentrated sulfuric acid free from sulfur trioxide with the calculated amount of oleum prior to the reaction, cooling the mixture and then adding the polymer either in the solid state or dissolved in concentrated sulfuric acid. This is a preferred embodiment of the method according to the invention. Another consists of first dissolving the polymer in concentrated sulfuric acid and then slowly adding oleum dropwise. Here, too, the sulfur trioxide content in the reaction mixture can be kept to less than 6% throughout the reaction. Another, but less preferred, possibility of performing the method according to the invention is to add sulfur trioxide either in pure solid state or in gaseous state to a solution of the polymer in concentrated sulfuric acid. This is less preferred because either localized high concentrations of sulfur trioxide (addition in the solid state) or localized overheating (addition as gas) may occur which encourage polymer degradation.

For both the outlined preferred embodiments in which oleum is used, the sulfur trioxide content of the oleum is preferably 65% by weight.

Another highly suitable possibility to produce sulfuric acid containing sulfur trioxide used as a reaction medium, other than using oleum, is to add to the concentrated sulfuric acid a compound which generates sulfur trioxide in concentrated sulfuric acid.

Phosphorus pentoxide, which liberates sulfur trioxide from concentrated sulfuric acid, can be preferably used for this purpose. Compounds of the type $M^n-(S_2O_7)^{2-}n/2$, where M is a metal and n is the valency of this metal, are also suitable. A highly suitable example for the method according to the invention is potassium disulfate, $K_2S_2O_7$.

Other suitable compounds are those which contain sulfur trioxide as a complex or covalently linked and liberate it under the conditions of sulfonation. The amount of one or more of the above compounds to be added is of course limited by the maximum sulfur trioxide content which can be present throughout the sulfonation reaction, i.e., less than 6% by weight.

The compound yielding sulfur trioxide may also be added to the sulfuric acid either prior to or after the addition of the polymer, as described above in the case of oleum.

Using phosphorous pentoxide has in addition in a few cases the advantage that sulfonation may be carried out at lower temperatures than when oleum is used, i.e. at temperatures at which oleum solidifies.

The advantage of using $K_2S_2O_7$ lies in the fact that this salt can be added in the form of a powder which can be easily handled, which makes the aimed-for liberation of sulfur trioxide possible and can avoid localized excessive concentration of sulfur trioxide.

Another measure which is essential for the method of the invention is temperature control during the sulfonation reaction. In order to keep polymer degradation and side reactions as low as possible, the temperature of the reaction mixture must be lower than 30° C. throughout the whole of the reaction. This is achieved by cooling. It is expedient to ensure that in addition no brief localized overheating occurs. If the chosen embodiment is that in which oleum is added dropwise to a solution of the polymer in sulfuric acid, then the addition should be carried out slowly and with stirring of the reaction mixture. Slow dropwise addition therefore means that further oleum is added only when the preceding amount has been dispersed in the mixture by stirring.

To dissolve the polymer the sulfuric acid may of course be heated to a temperature somewhat higher than +30° C. prior to adding the oleum, but expediently to not more than 40° C. The reaction temperature must then be cooled before the oleum is added.

The lower limit for the temperature of the reaction mixture during the reaction is chosen such that a homogeneous liquid is still present, i.e. that no component of the mixture is present as a solid aggregate. It is normally expedient not to operate at a temperature which is lower than about 5° C. The concentrated sulfuric acid free from sulfur trioxide, added as solvent, may contain water as mentioned. However, the water content must not be so high that the polymer is no longer soluble in the sulfuric acid at the reaction temperature. For the polymer to be soluble, the water content of the sulfuric acid should not exceed 20% by weight. A water content of 5% by weight or less is normally highly suitable, on the one hand because the polyether sulfones dissolve more readily in more highly concentrated sulfuric acid and on the other hand in order that not too much sulfur trioxide is consumed in the reaction with water which is faster than the sulfonation of the polymer.

In order to achieve higher degrees of sulfonation, it is recommended not to terminate the reaction immediately after the total amount of the coreactants is added to the solvent, but to allow the reaction to proceed for some time, for example 1 to 5 hours, with stirring and cooling. The reaction is expediently terminated by precipitating the polymer with water. This can be carried out by slowly pouring the reaction mixture into cold water. The polymer is subsequently isolated, washed and dried. In this connection, attention must be paid to the fact that shorter-chain and/or highly sulfonated polymeric units are more or completely soluble in water. These cannot of course be precipitated by water. Other means must therefore be chosen to isolate these products. However, these water-soluble by-products are normally of no value, since chemical resistance, i.e. insolubility of the material in water is necessary when sulfonated polyether sulfones are used, for example, for the preparation of membranes.

The degree of sulfonation of the polymer after the reaction is the quotient of the total number of the sulfonic acid groups in the polymer and the total number of self-repeating monomeric units. A degree of sulfonation of 0.2 thus indicates that on average a sulfonic acid group is present for every fifth monomeric unit. The degree of sulfonation determines the hydrophilic character or the ion exchange capacity of the sulfonated polymer. The degree of sulfonation may be readily determined on the one hand by titrating the sulfonic acid groups and on the other by determining the number of monomeric units. The latter determination can be calculated by dividing the molecular weight determined by conventional methods by the calculated molecular weight of the monomeric unit.

The ion exchange capacity (IEC) mentioned, which represents a measure of the hydrophilic character, can be given in meq/g. 1 meq/g means that per gram of polymer 1 mmol of protons may be exchanged against 1/n mmol of an n-valent cation.

The IEC may again be determined by titration.

For some applications, the sulfonated polymer in the form of free sulfonic acid group(s) is less suitable than in the form of their salt(s), for example metal or ammonium salts. The conversion to these salts may be carried out by neutralization with the corresponding bases in a solvent.

As mentioned, there are several possibilities for performing the method according to the invention, including those which use oleum. Two of these are particularly preferred. Whether one or the other alternative is chosen has an influence on the degree of sulfonation and on the yields of sulfonated polyether sulfones.

In one of the preferred embodiments (alternative I) the polymer is first dissolved in concentrated sulfuric acid free from sulfur trioxide, at a slightly elevated temperature if desired; the solution is cooled and oleum is then slowly added, for example dropwise, with stirring. In the second embodiment (alternative II) oleum is first added to concentrated sulfuric acid, the solution is cooled and the polymer is then added in the solid state or dissolved in concentrated sulfuric acid. In both cases the amount of oleum should be such that after the reaction of the sulfur trioxide with water which may be present in the sulfuric acid and/or in the polymer the content of sulfur trioxide, based on the total amount of pure sulfuric acid, is less than 6% by weight. It follows that the water content of the concentrated sulfuric acid and of the polymer must be determined before the preparation of the solution commences.

Alternative I normally leads to a smaller yield of sulfonated polymer which may be isolated by precipitation with water. It is assumed that in this procedure a greater amount of water-soluble compounds is formed than in alternative II. The yields of water-insoluble polymer are about 70% in alternative I, and normally 95-100% in alternative II, based in each case on the theoretical amount of sulfonated product to be expected from the amount of polymer used. With equal starting amounts, alternative II usually produces higher degrees of sulfonation than alternative I.

In a preferred embodiment, the temperature of the reaction mixture is less than 12° C. throughout the sulfonation reaction. In this manner any danger of localized overheating and polymer degradation is still further reduced.

Maximum concentration of the polymer in the starting mixture is limited on the one hand by its solubility characteristics, on the other by its processability. Polymer concentrations in the range between 5 and 30% by weight, based on the total amount of pure anhydrous sulfuric acid, are preferably used.

Polyether sulfones which are particularly suitable for the method according to the invention are polymers which are built up from the following self-repeating structural units:

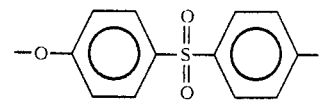

The molecular weight of the polyether sulfone used may vary within wide limits. Attention must of course be paid to the fact that low molecular weight end product are water-soluble and therefore unsuitable for some applications, especially at higher degrees of sulfonation. Polymers with an average molecular weight between 30,000 and 60,000 daltons are preferably used for the method of the invention.

The sulfonated polyether sulfones obtained by the method of the invention may be used advantageously for the preparation of membranes. The membranes obtained in this manner, because of their hydrophilic material, are particularly suitable for applications for which rapid wetting by liquid aqueous systems is desirable, for example in biotechnology, pharmaceuticals, foodstuffs technology and effluent purification or other processes in which substances are separated from aqueous liquid systems.

Membranes may be prepared from these sulfonated polyether sulfones by generally known methods, for example by pouring a film of a solution of the polymer, evaporating a part of the solvent and treatment with a precipitant for the polymer. The membranes may also be prepared in the form of hollow filaments (capillary membranes), for example by extruding a solution of the polymer through a hollow filament nozzle into a coagulation bath. In this process the nozzle may be immersed directly in the coagulation bath, but there may also be between the nozzle and the bath a so-called air gap, for example a few centimeters long, so that the solution formed under the nozzle is first conducted a short way in air before it is immersed in the coagulation bath. Examples of suitable solvents for this process are N,N-dimethylacetamide, N-methylpyrrolidone and dimethyl sulfoxide. The polymer solution may also contain other additives to acquire special properties, for example viscosity-raising additives such as polyvinylpyrrolidone or polyethylene glycol or non-solvents for the sulfonated polyether sulfone such as ethylene glycol, N-methylformamide, glycerol or water. Paraffin oil or a mixture of N,N-dimethylacetamide, glycerol and water may be used, for example, as the liquid for filling the lumen in the hollow filament extrusion; water or a mixture of water and the solvent in which the polymer was dissolved prior to extrusion, for example, may be used as the coagulation bath.

The sulfonated polyether sulfones with a degree of sulfonation between 0.001 and 0.6 are preferably employed for the membrane preparation. A degree of sulfonation of 0.01 to 0.6 is particularly favorable.

The membranes are suitable for a range of applications, whether they are present in the form of hollow filaments or tubes or as flat membranes. They are especially suitable as membranes for the field of microfiltration, i.e. with average pore sizes in the region of 0.05 to 5 $\mu$m and a porosity between 50 and 85%. The porosity is the quotient of the volume taken up by the membrane pores and the total volume of the membrane. The porosity may be determined by measuring the specific weight of the membrane and the specific weight of the non-porous membrane material.

The polymers obtained by the method of the invention may also be advantageously processed to form membranes in admixture with another polymer. This procedure has the advantage that, by mixing the same sulfonated polyether sulfone with another polymer selected according to the required type and amount, membranes are obtained whose hydrophilic properties may be selectively graduated. By forming a mixture with another less hydrophilic polymer, for example a polymer which contains no ionic or dissociable groups, it is possible furthermore to prepare a membrane of a given hydrophilic character often more cost effectively than by using solely a polyether sulfone with a low degree of sulfonation.

Membranes made from mixtures having a sulfonate content between 0.05 and 18% by weight, preferably from 0.1 to 18%, are highly suitable for a range of applications. This sulfonate content can be determined by titration. It is defined as the proportion by weight of SO$_3$H groups, based on the total weight of the polymer mixture.

The invention is demonstrated by the non-limiting application examples below:

EXAMPLE 1 (VARIANT I)

200 g (0.86 mole of monomeric units) of dried (in high vacuum at room temperature to constant weight) polyether sulfone (Victrex 5200P from ICI) are dissolved in 600 ml (about 1104 g) of concentrated sulfuric acid (about 97%; contains 1.7 mole of water). 125 ml of 65% oleum (2 moles of SO$_3$) are added dropwise over 1.5 hours with constant cooling to 10° C. and with stirring. When all of the oleum has been added, the reaction mixture is stirred for a further three hours at 10° C., the viscous solution is then run into 10-15 liters of water and the precipitated polymer is filtered off. It is washed with water until the washings have no longer an acid reaction, and is dried at room temperature. The yield is 140 g of sulfonated polyether sulfone (SPES). The product has a reduced viscosity of $n_{red}=0.53\times10^{-1}$ liters/g and a degree of sulfonation (measured by titration) of DS=0.16.

From these examples the reduced viscosities were determined on solutions of 0.4 g of the polymer in 100 ml of concentrated sulfuric acid at room temperature.

EXAMPLE 2 (VARIANT II)

600 ml (about 1104 g) of concentrated sulfuric acid (about 97%; contains about 1.7 mole of water) are initially taken and stirred with 125 ml of 65% oleum (2 moles of SO$_3$) (temperature rise to 60° C.). The mixture is cooled to about 10° C and 200 g (0.86 mole of monomeric units) of polyether sulfone (Victrex 5200P; ICI) are added in the solid state in a single portion with vigorous stirring. The stirring is continued for a further three hours at 10° C. and the mixture is worked up as in Example 1. Sulfonated material is obtained with a yield of 217 g of SPES, which corresponds to theory.

The product has a reduced viscosity of $n_{red}=0.42\times10^{-1}$ liters/g and a degree of sulfonation (measured by titration) of DS=0.22.

The Victrex 5200P used in this case is a polyether sulfone having the structure shown in the Background section above.

EXAMPLE 3

This Example illustrates the increase of the degree of sulfonation with reaction time and rise in temperature. With longer reaction times the degree of substitution increases. The reaction was carried out by variant II, the polymer being dried prior to the addition. The reaction temperature was 25° C. The following degrees of sulfonation (DS) and viscosities were obtained in relation to reaction time:

| Time (h) | DS | $n_{red}$ |
| --- | --- | --- |
| 1 | 0.315 | 0.373 |
| 3 | 0.336 | 0.352 |
| 5 | 0.347 | 0.350 |
| 22 | 0.384 | 0.325 |

The maximum degree of sulfonation theoretically attainable in 97.00% sulfuric acid is DS=0.39.

EXAMPLE 4

The procedure described in Example 1 is repeated without drying the polymer beforehand. The sulfonated product has a reduced viscosity of $n_{red}=0.58\times 10^{-1}$ liters/g at a degree of sulfonation of DS=0.09.

EXAMPLE 5

Example 2 was repeated, the starting material being dried beforehand in high vacuum at room temperature. The sulfonated product had a degree of sulfonation of DS=0.37 at a reduced viscosity of $n_{red}=0.42\times 10^{-1}$ liters/g.

EXAMPLE 6

Sulfonation of Victrex by evolution of SO$_3$ from P$_2$O$_5$ 70 g of P$_2$O$_5$ powder were rapidly stirred into 350 ml of 97% H$_2$SO$_4$. When the P$_2$O$_5$ powder had dissolved, the reaction mixture was cooled to $-13°$ C. 100 g of dried Victrex were added to the solution and the mixture was stirred at about $-7°$ C. for about 5 hours. The reaction was then terminated by careful addition of water and the product was worked up as in Example 1. The Victrex used was the same material as that used in Example 1.

Yield: 115 g of sulfonated PES
DS=0.35; $n_{red}=0.423\times 10^{-1}$ liters/g

EXAMPLE 7 SULFONATION OF VICTREX BY EVOLUTION OF SO$_3$ FROM K$_2$S$_2$O$_7$ 30 g of K$_2$S$_2$O$_7$ were dissolved in 350 ml of 100% sulfuric acid at room temperature and 100 g of dried Victrex were added subsequently. The Victrex used and the working u steps were the same as in Example 1.

| Reaction time | DS | $n_{red}$ ($10^{-1}$ l/g) |
|---|---|---|
| 6 h | 0.190 | 0.361 |
| 24 h | 0.272 | 0.287 |
| 6 d | 0.310 | 0.229 |
| 20 d | 0.398 | 0.266 |

The example described was repeated, but the polymer was first dissolved in 100% sulfuric acid. K$_2$S$_2$O$_7$ was added subsequently. The reaction temperature was $+10°$ C.

| Reaction time | DS | $n_{red}$ ($10^{-1}$ l/g) |
|---|---|---|
| 6 h | 0.080 | — |
| 22 h | 0.127 | — |
| 2 d | 0.136 | 0.41 |
| 4 d | 0.150 | 0.38 |
| 7 d | 0.200 | 0.37 |

EXAMPLE 8 (COMPARISON EXAMPLE NOT ACCORDING TO INVENTION)

Example 5 was repeated, except that the reaction temperature was set to 40° C. After a reaction time of three hours and pouring of the solution in water with stirring, a colloidal solution of strongly degraded polymer was obtained from which no useful product could be filtered off.

EXAMPLE 9 (COMPARISON EXAMPLE NOT ACCORDING TO INVENTION)

Example 6 was repeated, except that the reaction time was 24 hours at 40° C. The mixture was poured into water, yielding an exclusively water-soluble reaction product.

We claim:

1. A sulfonation method comprising sulfonating at least one aromatic polyether sulfone comprising the self-repeating structural unit:

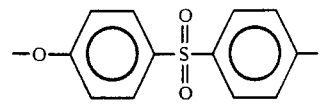

in a solution of sulfur trioxide in concentrated sulfuric acid, the content of sulfur trioxide, based on the total amount of pure sulfuric acid present in the reaction mixture, being kept to a value of less than 6 percent by weight throughout the whole of the sulfonation reaction and the temperature of the reaction mixture being kept at less than $+12°$ C. throughout the whole of the reaction.

2. The method as claimed in claim 1, wherein subsequent to the sulfonation the sulfonated polymer is precipitated by being poured in water and subsequently isolated and dried.

3. The method as claimed in claim 1, wherein oleum is added to concentrated sulfuric acid, the resultant solution is cooled and the polyether sulfone is then added in a form selected from the group consisting of the solid state and dissolved in concentrated sulfuric acid.

4. The method as claimed in claim 1, wherein the polyether sulfone is first dissolved in concentrated sulfuric acid and oleum is subsequently slowly added dropwise to the reaction mixture with stirring.

5. The method as claimed in claim 3, wherein the oleum contains 65% by weight of SO$_3$.

6. The method as claimed in claim 4, wherein the oleum contains 65% by weight of SO$_3$.

7. The method as claimed in claim 1, wherein the concentrate sulfuric acid containing sulfur trioxide is obtained by addition to concentrated sulfuric acid of a compound which generates sulfur trioxide in concentrated sulfuric acid.

8. The method as claimed in claim 7, wherein said compound is selected from the group consisting of phosphorus pentoxide and a compound of the formula $M n^+ - (S_2O_7)^{-2} n/2$, where M is a metal and n is the valency of said metal.

9. The method as claimed in claim 7, wherein said compound is K$_2$S$_2$O$_7$.

10. The method as claimed in claim 1, wherein sulfonic acid groups of the resultant sulfonated aromatic polyether sulfone are converted into at least one member selected from the group consisting of metal salts and ammonium salts.

11. The method as claimed in claim 1, wherein a concentration of said aromatic polyether sulfone in said solution, based on the total amount of pure anhydrous sulfuric acid, is between 5 and 30% by weight at the start of the reaction.

12. The method as claimed in claim 1, wherein an average molecular weight of said aromatic polyether sulfone is between 30,000 and 60,000 daltons.

13. The method as claimed in claim 1, further comprising forming the resultant sulfonated polyether sulfone into the form of a membrane.

14. The method as claimed in claim 13, wherein said sulfonation is carried out to a degree of sulfonation between 0.001 and 0.6.

15. The method as claimed in claim 14, wherein said sulfonation is carried out to a degree of sulfonation between 0.01 and 0.6.

16. The method as claimed in claim 13, wherein the membrane is in a form selected from the group consisting of hollow filaments, tubes and flat membranes.

17. The method as claimed in claim 13, wherein said membrane is a microfiltration membrane with an average pore size in the region of 0.05 to 5 $\mu$m and a porosity between 50 and 85%.

18. The method as claimed in claim 1, wherein the content of sulfur trioxide is kept to a value of less than 3% by weight throughout the whole of the sulfonation.

* * * * *

UNITED STATES PATENT AND TRADEMARK OFFICE
CERTIFICATE OF CORRECTION

PATENT NO. : 5,013,765
DATED : May 7, 1991
INVENTOR(S) : Heinz-Dieter SLUMA et al It is certified that error appears in the above-identified patent and that said Letters Patent is hereby corrected as shown below:

Col. 9, line 31, change "u" to --up--.

Col. 10, claim 7, line 38, change "concentrate" to --concentrated--.

Signed and Sealed this

Sixth Day of October, 1992

*Attest:*

DOUGLAS B. COMER

*Attesting Officer*   *Acting Commissioner of Patents and Trademarks*